United States Patent
Lee et al.

(10) Patent No.: US 6,656,999 B1
(45) Date of Patent: Dec. 2, 2003

(54) METHOD OF PREPARING SYNTHETIC RUBBER LATEX HAVING A LARGE PARTICLE SIZE

(75) Inventors: Byeong-Do Lee, Chunla-Namdo (KR); Sang-Dong Park, Chunla-Namdo (KR); Young-Sun Jun, Chunla-Namdo (KR); Kwang-Yeol Lim, Chunla-Namdo (KR); Sang-Kyu Park, Chunla-Namdo (KR)

(73) Assignee: Cheil Industries Inc., Kyungbuk (KR)

( * ) Notice: Subject to any disclaimer, the term of this patent is extended or adjusted under 35 U.S.C. 154(b) by 112 days.

(21) Appl. No.: 09/699,311

(22) Filed: Oct. 27, 2000

(30) Foreign Application Priority Data

Oct. 29, 1999 (KR) .......................................... 1999-47410

(51) Int. Cl.7 ............................ C08L 29/04; C08L 31/06
(52) U.S. Cl. ...................... 524/502; 524/524; 524/458; 524/460
(58) Field of Search ................................ 524/522, 502, 524/500, 501, 458, 460, 492, 493, 832, 835, 836, 748, 764, 777

(56) References Cited

U.S. PATENT DOCUMENTS

| | | | |
|---|---|---|---|
| 3,049,500 A | | 8/1962 | Howland et al. |
| 5,093,449 A | * | 3/1992 | Cronin |
| 5,294,659 A | * | 3/1994 | Kidder ........................ 524/458 |
| 5,468,788 A | | 11/1995 | Kulich |
| 5,510,399 A | | 4/1996 | Sauer |
| 5,633,304 A | | 5/1997 | Kulich |

FOREIGN PATENT DOCUMENTS

| EP | 0 143 858 | | 6/1985 |
|---|---|---|---|
| EP | 0 143 858 A1 | * | 6/1985 |

* cited by examiner

*Primary Examiner*—Robert Harlan
(74) *Attorney, Agent, or Firm*—Maria Parrish Tungol

(57) ABSTRACT

The present invention provides a method of preparing a synthetic rubber latex having a large particle size, showing good stability and reducing coagulum during polymerization, which comprises (a) pretreating a seed synthetic rubber latex by mixing the seed synthetic rubber latex with deionized water and a small amount of an emulsifier and stirring, (b) preparing an agglomerating latex with a pH value of about 5.0~8.0 by mixing a copolymer latex containing unsaturated acid having from about 10 to about 50% by weight of solid content with deionized water and a pH controlling agent, and (c) adding the pretreated seed synthetic rubber latex of step (a) to the agglomerating latex of step (b). The step (c) may be carried out by adding the pretreated seed synthetic rubber latex dropwisely to the agglomerating latex containing unsaturated acid for about 30 minutes to about 1 hour.

23 Claims, No Drawings

METHOD OF PREPARING SYNTHETIC RUBBER LATEX HAVING A LARGE PARTICLE SIZE

FIELD OF THE INVENTION

The present invention relates to a method for preparing synthetic rubber latex having a large particle size. More particularly, the present invention relates to a method for preparing synthetic rubber latex having a large particle size by adding a synthetic rubber latex as a seed latex to a copolymer latex containing unsaturated acid monomers as an agglomerating agent.

BACKGROUND OF THE INVENTION

In general, a synthetic rubber latex having a large particle size is used in preparation of high-impact ABS (acrylonitrile-butadiene-styrene) resin, non-glossy ABS resin, foam rubber and so on. Several methods are envisaged to prepare a synthetic rubber latex having a large particle size and these are as follows: (1) regulation of the particle size by controlling the pH value in the polymerization of latex through addition of a base or an acid, (2) addition of an inorganic electrolyte or. an emulsifier during polymerization, (3) agglomeration of the latex by freezing, and (4) mechanical or chemical agglomeration of the synthetic rubber latex particles after polymerization. These methods have been known, however, these methods are disadvantageous, because methods (1) and (2) take a long polymerization time and methods (3) and (4) produce a lot of coagulum.

In order to overcome the shortcomings above, Japanese Patent Publication No.56-45921, and Japanese Patent Laid-open Nos. 58-061102, 59-149902 and U.S. Pat.No. 5,633, 304 disclose methods of preparing a synthetic rubber latex having a large particle size by adding an agglomerating agent after completion of polymerization of a synthetic rubber latex. A latex copolymerized with an alkyl acrylate and an unsaturated acid is used as an agglomerating agent. In the other hand, Japanese Patent Laid-open No.59-093701 discloses a latex copolymerized with a conjugated diene monomer and an unsaturated acid as an agglomerating agent.

When a copolymer latex containing unsaturated acid is used as an agglomerating agent as in the Japanese patent applications above, the synthetic rubber latex having a large particle size can be obtained. However, as the stability of the latex deteriorates, coagulum occurs. In case small particle size latex is prepared in a large amount, the latex is not uniform because a bimodal type latex is formed. Such latex cannot be utilized for requiring uniform distribution of the latex.

Accordingly, the present inventors have developed a method of preparing a synthetic rubber latex which has a large particle size, shows good stability and reduces coagulum during polymerization, by controlling the pH value and solid content of the copolymer latex having unsaturated acid which is used for agglomerating a seed latex.

OBJECTS OF THE INVENTION

A feature of the present invention is the provision of a method of preparing a synthetic rubber latex that has a large particle size and shows good stability, which comprises controlling the pH value and solid content of the copolymer latex having unsaturated acid which is used as an agglomerating agent.

Another feature of the present invention is the provision of a method of preparing a synthetic rubber latex having a large particle size, showing a uniform distribution, and reducing coagulum by adding a seed synthetic rubber latex with from about 30 to about 55% by weight of solid content and pH value of more than 7.0 as a seed latex to a copolymer latex containing unsaturated acid as an agglomerating agent.

A further feature of the present invention is the provision of a method of preparing a synthetic rubber latex with a large particle size, which is economical due to a shorter preparation time rather than other methods, by adding a seed synthetic rubber latex with from about 30 to about 55% by weight of solid content and pH value of more than 7.0 and with particle sizes from about 500 to about 2000 Å as a seed latex to a copolymer latex containing unsaturated acid as an agglomerating agent.

The above and other features and advantages of this invention will be apparent from the ensuing disclosure and appended claims.

SUMMARY OF THE INVENTION

The present invention provides a method of preparing a synthetic rubber latex having a large particle size, showing good stability and reducing coagulum during polymerization, which comprises (a) pretreating a seed synthetic rubber latex by mixing the seed synthetic rubber latex deionized water and a small amount of an emulsifier and stirring, (b) preparing an agglomerating latex with a pH value of about 5.0~8.0 by mixing a copolymer latex containing unsaturated acid having from about 10 to about 50% by weight of solid content with deionized water and a pH controlling agent, and (c) adding the pretreated seed synthetic rubber latex of step (a) to the agglomerating latex of step (b). The step (c) may be carried out by adding the pretreated seed synthetic rubber latex dropwisely to the agglomerating latex containing unsaturated acid for about 30 minutes to about 1 hour.

DETAILED DESCRIPTION OF THE INVENTION

The present invention provides a method of preparing a synthetic rubber latex having a large particle size, showing good stability and reducing coagulum during polymerization. Also the method is economical due to a shorter preparation time. The method comprises (a) pretreating a seed synthetic rubber latex by mixing the seed synthetic rubber latex with deionized water and a small amount of an emulsifier and stirring, (b) preparing an agglomerating latex with a pH value of 5.0~8.0 by mixing a copolymer latex containing unsaturated acid having from about 10 to about 50% by weight of solid content with deionized water and a pH controlling agent, and (c) adding the pretreated seed synthetic rubber latex of step (a) to the agglomerating latex of step (b). The each step will be described in detail as below.

Step (a): Pretreating of Seed Synthetic Rubber Latex

A seed synthetic rubber latex that is usable in the present invention is prepared by a conventional emulsion polymerization process using an emulsifier. The emulsifier is not limited, however, at least one anion surfactant can be used as emulsifier.

The representative examples of the seed synthetic rubber latex include polybutadiene, butadiene-styrene copolymer, butadiene-a-methyl styrene copolymer, butadiene-acrylate copolymer, butadiene-methacrylate copolymer, etc. The seed latex is not limited particularly to these examples.

It is preferable that the seed synthetic rubber latex has particle sizes from about, 500 to about 2000 Å. In case the range of the particle size is in from about 500 to about 2000 Å, it is easy to control the average particle size of the latex to be in about 5,000 to about 10,000 Å after agglomeration. If the particle size is smaller than 500 Å, the viscosity of the seed synthetic rubber latex increases, which will cause a problem when pumping to transfer, and a desirable latex cannot be obtained because of small particle sizes. On the other hand, if the particle size is larger than 2,000 Å, although synthetic rubber latex having large particle sizes can be produced, it takes longer time to polymerize the seed synthetic rubber latex, and: coagulum occurs, which will cause poor stability of the latex.

It is preferable to adjust the pH value of the seed synthetic rubber latex to higher than 7.0. If the pH value is lower than 7.0, a large amount of coagulum is formed when a grafted ABS copolymer is polymerized from the synthetic rubber latex.

Furthermore it is preferable that the seed synthetic rubber latex has a solid content of from about 30 to about 55% by weight. If the solid content is less than 30% by weight, it is difficult to regulate the contents of monomer/water of grafted ABS resin when the ABS resin is polymerized, which will cause a high cost for transportation due to a large amount of water. On the other hand, if the solid content is over 55% by weight, coagulum occurs when polymerizing.

The seed synthetic rubber latex is pretreated by mixing a synthetic rubber latex with deionized water and a small amount of an emulsifier over agitation.

Step (b): Preparing Agglomerating Latex Containing Unsaturated Acid

In accordance with the present invention, a copolymer latex containing unsaturated acid is used as an agglomerating agent. The copolymer latex is prepared by polymerizing an unsaturated acid monomer with a carboxyl group and a monomer being polymerized with the acid polymer. The unsaturated acid monomer is an unsaturated methylene carboxylic acid of which examples include acrylic acid, methacrylic acid, methyl acrylic acid, itaconic acid, crotonic acid, fumaric acid, and maleic acid. The examples of the monomer being polymerized with the acid monomer include acrylates such as methyl methacrylate, methyl acrylate and ethyl acrylate; $C_{4-6}$ conjugated dienes such as butadiene and isoprene; monovinyl aromatic compounds such as styrene, a-methyl styrene, vinyl-toluene and chlorostyrene; and acrylic monomers such as acrylonitrile and methacrylonitrile. Preferably, the agglomerating agent is prepared by copolymerizing at least one unsaturated acid monomer with a carboxyl group and a monomer being polymerized with the unsaturated acid polymer.

The copolymer latex is prepared by a conventional emulsion polymerization process. It is preferable that the copolymer latex has about 1~50% by weight of unsaturated acid monomer containing carboxylic acid, more preferably about 10~30% by weight, for stability of the synthetic rubber latex having a large particle size.

The agglomerating latex according to the present invention is prepared at a pH value of about 5.0~8.0 by mixing a copolymer latex containing unsaturated acid with deionized water and a pH controlling agent. When the pH value is kept between about 5.0 to about 8.0, the agglomerating latex is most stable.

It is preferable that the agglomerating latex has from about 10 to about 50% by weight of solid content. The agglomerating latex is preferably used as an agglomerating agent in the range from about 0.5 to about 10 parts by weight per 100 parts by weight of solid content of the seed synthetic rubber latex. If the agglomerating agent is used less than 0.5 parts by weight, a large amount of small particle size polymer is prepared due to weak agglomerating ability. On the other hand, if the agglomerating agent is used more than 10 parts by weight, the latex has a particle size of at least 2 μm (20,000 Å) due to strong agglomerating ability, which will cause to occur coagulum. More preferably, the agglomerating latex is used in the range from about 0.5 to about 5 parts by weight per 100 parts by weight of solid content of the seed synthetic rubber latex.

Step (c): Producing Synthetic Rubber Latex Having Large Particle Size

The synthetic rubber latex having a large particle size can be prepared by adding the pretreated seed synthetic rubber latex of step (a) to the agglomerating latex of step (b). The seed synthetic latex is slowly added to the agglomerating agent while agitation keeps going. The step (c) may be carried out by adding the pretreated seed synthetic rubber latex dropwisely to the agglomerating latex containing unsaturated acid for about 30 minutes to about 1 hour.

The present invention will be described in more detail by the following Examples. The Examples are given only to illustrate the present invention and not intended in any way to limit the scope of the invention.

EXAMPLES

Examples 1A–1D (1) Preparation of Seed Synthetic Rubber Latex

Four seed synthetic rubber latexes were prepared by polymerizing 150 parts by weight of deionized water, 100 parts by weight of butadiene, 0.5 part by weight of t-dodecylmerchaptan (t-DDM), 1.0, 2.0, 3.0 and 4.0 parts by weight of alkylbenzenesulfonate, respectively, 1.0 part by weight of potassium carbonate and 0.3 part by weight of potassium persulphate at the reaction temperature of 65° C. The seed synthetic rubber latexes have particle sizes from about 700 to about 2000 Å. The four synthetic rubber latexes were employed to Examples 1A, 1B, 1C and 1D, respectively.

(2) Preparation of Agglomerating Copolymer Latex

The agglomerating copolymer latex was prepared by polymerizing 185 parts by weight of deionized water, 20 parts by weight of butadiene, 30 parts by weight of methacylic acid, 50 parts by weight of ethyl acrylate, 3.5 parts by weight of potassium oleate, 0.5 part by weight of potassium carbonate and 0.3 part by weight of potassium persulfate for 8 hours at 65° C. An agglomerating copolymer latex with an average particle size of 1000 Å and a pH of 2.4 was obtained.

(3) Preparation of Synthetic Rubber Latex Having Large Particle Size

Step (a): 100 parts by weight of the seed synthetic rubber latex prepared as above was pretreated by mixing with 10 parts by weight of deionized water and 1 part by weight of alkyl benzene sulfonate and the resulting solution was agitated for 30 minutes.

Step (b): Agglomerating copolymer latex was prepared by mixing 20 parts by weight of deionized water and 1 part by weight of potassium carbonate with 5 parts by weight of the copolymer latex prepared as above. The resulting solution was agitated for 30 minutes. The pH of the agglomerating copolymer latex was 6.5.

Step (c): In a 20 liter reactor, the pretreated seed synthetic rubber latex 100 parts was dropwisely to the agglomerating copolymer latex 5 parts during agitation for one hour. After two hours, a synthetic rubber latex having a large particle size was obtained.

Particle Size: The ratio of latex having particle sizes of less than 1500 Å was measured by fractional creaming with sodium alginate, and the average particle size was measured by NICOMP 370 (particle size analyzer). The result is shown in Table 1.

TABLE 1

| Example | Before agglomeration Average Particle Size (Å) | After agglomeration Average Particle Size (Å) | Coagulum (%) | Ratio of 0.15 µm or less (wt %) |
|---|---|---|---|---|
| 1A | 2000 | 9000 | 0.07 | 0.8 |
| 1B | 1500 | 7400 | 0.07 | 3.2 |
| 1C | 1100 | 6800 | 0.05 | 5.4 |
| 1D | 700 | 6000 | 0.03 | 8.6 |

Examples 2A–2D

The seed synthetic rubber latex prepared in Example 1B was used in Examples 2A–2D. Examples 2A–2D were conducted in the same manner as in Example 1B except varying the amount of the agglomerating copolymer latex to be used. 1.0, 3.0, 7.0 and 10.0 parts by weight of the agglomerating copolymer latex were used in Examples 2A, 2B, 2C and 2D, respectively. The test result was shown in Table 2. In Examples 2A–2D, the pHs of the agglomerating copolymer latexes were 8.0, 7.0, 5.9 and 5.0, respectively.

TABLE 2

| Example | Before agglomeration Average Particle Size (Å) | After agglomeration Average Particle Size (Å) | Coagulum (%) | Ratio of 0.15 µm or less (wt %) |
|---|---|---|---|---|
| 2A | 1500 | 6800 | 0.05 | 11.4 |
| 2B | 1500 | 7100 | 0.05 | 4.5 |
| 2C | 1500 | 9400 | 0.10 | 0.9 |
| 2D | 1500 | 10200 | 1.20 | 0.7 |

Comparative Examples 1A–1D

Comparative Examples 1A–1D were conducted in the same manner as in Example 1 except the step (c). In these Comparative Examples, the agglomerating copolymer latex was added to the pretreated seed synthetic rubber latex. The test result was shown in Table 3. As shown in Table 3, coagulum occurred heavily and large portion of small particle size latex were prepared compared to Examples 1A–1D and 2A–2D.

TABLE 3

| Comp. Ex. | Before agglomeration Average Particle Size (Å) | After agglomeration Average Particle Size (Å) | Coagulum (%) | Ratio of 0.15 µm or less (wt %) |
|---|---|---|---|---|
| 1A | 2000 | 8400 | 5.4 | 0.5 |
| 1B | 1500 | 7700 | 8.4 | 7.2 |
| 1C | 1100 | 6600 | 9.7 | 17.4 |
| 1D | 700 | 6400 | 8.7 | 30.6 |

In the above, the present invention was described based on the preferred embodiment of the present invention, but it should be apparent to those ordinarily skilled in the art that various changes and modifications can be added without departing from the spirit and scope of the present invention. Such changes modifications should come within the scope of the present invention.

What is claimed is:

1. A method of preparing a butadiene rubber latex having a large particle size, showing good stability and reducing coagulum during polymerization, which comprises:
    (a) pretreating a seed butadiene rubber latex by mixing the seed butadiene rubber latex with deionized water and a small amount of an emulsifier and stirring;
    (b) preparing an agglomerating latex with a pH value of about 5.0–8.0 by mixing a copolymer latex containing unsaturated carboxylic acid having from about 10 to about 50% by weight of solid content with deionized water and a pH controlling agent; and
    (c) adding the pretreated seed butadiene rubber latex of step (a) to the agglomerating latex of step (b).

2. The method of claim 1 wherein said copolymer latex containing unsaturated carboxylic acid is a copolymer of an unsaturated acid monomer with a carboxyl group and a monomer being polymerized with the acid polymer.

3. The method of claim 2 wherein said unsaturated acid monomer with a carboxyl group is selected from the group consisting of acrylic acid, methacrylic acid, methyl acrylic acid, itaconic acid, crotonic acid, fumaric acid, and maleic acid.

4. The method of claim 2 wherein said monomer being polymerized with the acid monomer is selected from the group consisting of acrylates, $C_{4-6}$ conjugated dienes, styrenes, acrylonitrile and methacrylonitrile.

5. The method of claim 1 wherein said agglomerating latex is used 0.5 to 30 parts by weight per 100 parts by weight of solid content of said seed butadiene rubber latex.

6. The method of claim 1 wherein said seed butadiene rubber latex has an average particle size from about 500 to about 2000 Å, a solid content from about 30 to about 55% by weight, and a pH value of 7.0 or higher.

7. The method of claim 1 wherein said seed butadiene rubber latex is selected from he group consisting of polybutadiene, butadiene-styrene copolymer, butadiene-α-methylstyrene copolymer, butadiene-acrylate copolymer and butadiene-methacrylate copolymer.

8. The method of claim 1 wherein said step (c) is carried out by adding the pretreated seed rubber latex dropwisely to the agglomerating latex containing unsaturated acid for about 30 minutes to about 1 hour.

9. A butadiene rubber latex having a large particle size which is prepared by the process of claim 1.

10. A method of preparing a butadiene rubber latex having a large particle size comprising:
    (a) pretreating a seed butadiene rubber latex by mixing the seed butadiene rubber latex with deionized water and an emulsifier;

(b) preparing all agglomerating latex with a pH value of about 5.0~8.0 by mixing a copolymer latex having from about 10 to about 50% by weight of solid content with deionized water and a pH controlling agent; and (c) adding the pretreated seed latex of step (a) to the agglomerating latex of step (b), wherein the copolymer latex is a copolymer of an unsaturated carboxylic acid monomer.

11. The method of claim 10 wherein said unsaturated acid monomer with a carboxyl group is selected from the group consisting of acrylic acid, methacrylic acid, methyl acrylic acid, itaconic acid, crotonic acid, finaric acid, and maleic acid.

12. The method of claim 10 wherein said monomer being polymerized with the acid monomer is selected from the group consisting of acrylates, $C_{4-6}$ conjugated dienes, styrenes, acrylonitrile and methacrylonitrile.

13. The method of claim 10 wherein said agglomerating latex is used 0.5 to 30 parts by weight per 100 parts by weight of solid content of said seed butadiene rubber latex.

14. The method of claim 10 wherein said seed butadiene rubber latex has an average particle size from about 500 to about 2000 Å, a solid content from about 30 to about 55% by weight, and a pH value of 7.0 or higher.

15. The method of claim 10 wherein said seed butadiene rubber latex is selected from the group consisting of polybutadiene, butadiene-styrene copolymer, butadiene-a-methylstyrene copolymer, butadiene-acrylate copolymer and butadiene-methacrylate copolymer.

16. The method of claim 10 wherein said step (c) is carried out by adding the pretreated seed latex dropwise to the agglomerating latex for about 30 minutes to about 1 hour.

17. The method of claim 10 wherein the seed latex is polybutadiene and the agglomerating latex is a methacrylic acid/ethyl acrylate copolymer latex and the emulsifier is an alkyl benzene sulfonate.

18. A butadiene rubber latex having a large particle size prepared by the process of claim 10.

19. A method of preparing a butadiene rubber latex having a large particle size comprising:

(a) pretreating a seed rubber latex by mixing the seed rubber latex with deionized water and an emulsifier;

(b) preparing an agglomerating latex with a pH value of about 5.0~8.0 by mixing a copolymer latex having from about 10 to about 50% by weight of solid content with deionized water and a pH controlling agent; and (c) adding the pretreated seed latex of step (a) to the agglomerating latex of step (b), wherein the seed rubber latex is selected from the group consisting of polybutadiene, butadiene-styrene copolymer, butadiene-α-methylstyrene copolymer, butadiene-acrylate copolymer and butadiene-methacrylate copolymer and the copolymer latex is a copolymer of a monomer selected from the group consisting of acrylic acid, methacrylic acid, methyl acrylic acid, itaconic acid, crotonic acid, fumaric acid, and maleic acid and a comonomer selected from the group consisting of methyl methacrylate, methyl acrylate, ethyl acrylate, butadiene, isoprene, styrene, α-methylstyrene, vinyl toluene, chlorostyrene, acrylonitrile and methacrylonitrile.

20. The method of claim 19 wherein said agglomerating latex is used 0.5 to 30 parts by weight per 100 parts by weight of solid content of said seed butadiene rubber latex.

21. The method of claim 19 wherein said seed butadiene rubber latex has an average particle size from about 500 to about 2000 Å, a solid content from about 30 to about 55% by weight, and a pH value of 7.0 or higher.

22. The method of claim 19 wherein the seed latex is polybutadiene and the agglomerating latex is a methacrylic acid/ethyl acrylate copolymer latex and the emulsifier is an alkyl benzene sulfonate.

23. A butadiene rubber latex having a large particle size prepared by the process of claim 19.

* * * * *